(12) United States Patent
Morrison et al.

(10) Patent No.: US 6,905,807 B2
(45) Date of Patent: *Jun. 14, 2005

(54) LIQUID INKS COMPRISING STABILIZING ORGANOSOLS

(75) Inventors: Eric D. Morrison, West St. Paul, MN (US); Julie Qian, Woodbury, MN (US); James A. Baker, Hudson, WI (US); Christopher J. Wolters, W. St. Paul, MN (US); Kam W. Law, Woodbury, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 106 days.

This patent is subject to a terminal disclaimer.

(21) Appl. No.: 10/334,398

(22) Filed: Dec. 31, 2002

(65) Prior Publication Data

US 2003/0134940 A1 Jul. 17, 2003

Related U.S. Application Data

(60) Provisional application No. 60/347,184, filed on Jan. 8, 2002, and provisional application No. 60/346,946, filed on Jan. 8, 2002.

(51) Int. Cl.$^7$ .................................................. G03G 9/13
(52) U.S. Cl. ................... 430/114; 430/115; 523/160
(58) Field of Search .................... 430/114, 155, 430/115; 523/160, 161

(56) References Cited

U.S. PATENT DOCUMENTS

| | | | |
|---|---|---|---|
| 4,229,513 A | 10/1980 | Merrill et al. | 430/115 |
| 4,415,533 A | 11/1983 | Kurotori et al. | 422/4 |
| 4,476,210 A | 10/1984 | Croucher et al. | 430/114 |
| 4,538,899 A | 9/1985 | Landa et al. | 355/10 |
| 4,547,449 A | 10/1985 | Alexandrovich et al. | 430/115 |
| 4,760,423 A | 7/1988 | Holtje et al. | 355/3 |
| 4,910,108 A | 3/1990 | Tavernier et al. | 430/32 |
| 4,978,598 A | 12/1990 | Elmasry et al. | 430/137 |
| 4,988,602 A | 1/1991 | Jongewaard et al. | 430/115 |
| 5,066,559 A | 11/1991 | Elmasry et al. | 430/111 |
| 5,106,717 A | 4/1992 | Houle et al. | 430/114 |
| 5,112,718 A | 5/1992 | Kato et al. | 430/114 |
| 5,254,425 A | 10/1993 | Suzuki et al. | 430/115 |
| 5,342,725 A | 8/1994 | Kato | 430/115 |
| 5,482,809 A | 1/1996 | Rao et al. | 430/114 |
| 5,484,679 A | 1/1996 | Spiewak et al. | 430/115 |
| 5,525,448 A | 6/1996 | Larson et al. | 430/115 |
| 5,532,099 A | 7/1996 | Horie et al. | 430/115 |
| 5,604,070 A | 2/1997 | Rao et al. | 430/110 |
| 5,652,282 A | 7/1997 | Baker et al. | 523/201 |
| 5,698,616 A | 12/1997 | Baker et al. | 523/201 |
| 5,737,674 A | 4/1998 | Venkatesan et al. | 399/250 |
| 5,886,067 A | 3/1999 | Li et al. | 523/201 |
| 6,103,781 A | 8/2000 | Li et al. | 523/201 |
| 6,255,363 B1 | 7/2001 | Baker et al. | 523/201 |
| 6,427,449 B1 | 8/2002 | Logan et al. | 62/3.4 |

FOREIGN PATENT DOCUMENTS

| | | | |
|---|---|---|---|
| EP | 0 438 894 A1 | 7/1991 | G03G/9/13 |
| EP | 1 251 406 A2 | 10/2002 | |
| WO | WO 97/12284 | 4/1997 | |
| WO | WO 98/24002 | 6/1998 | |
| WO | WO 01/79363 A2 | 10/2001 | C09D/11/00 |
| WO | WO 01/79364 A2 | 10/2001 | C09D/11/00 |

*Primary Examiner*—John L Goodrow
(74) *Attorney, Agent, or Firm*—Mark A. Litman & Associates, P.A.

(57) ABSTRACT

A liquid ink for developing electrophotography images comprises:
  a) a carrier liquid having a Kauri-Butanol number less than 30;
  b) a grafted co-polymer comprising a (co)polymeric steric stabilizer covalently bonded to a thermoplastic (co) polymeric core that is insoluble in the carrier liquid, wherein the grafted co-polymer is derived from at least a polymerizable organic compound having at least one acid group or at least one acid group;
  c) a dispersant having, respectively, at least an amine group or at least one acid group to form an acid-base copolymer-dispersant system or a base-acid copolymer-dispersant system, wherein the mole ratio of the amine group to the acid group is between 0.3 and 1.5 in the base-acid copolymer-dispersant system and the mole ratio of the acid group to the base group in the acid-base copolymer dispersant system is between 0.3 and 1.5; and
  d) a positive charge director with the acid-base copolymer charge dispersant system and a negative charge director with the base-acid copolymer charge-dispersant system.

17 Claims, No Drawings

LIQUID INKS COMPRISING STABILIZING ORGANOSOLS

This application claims benefit of Provisional Application No. 60/347,184 filed Jan. 8, 2002 and Provisional Application No. 60/346,946 filed Jan. 8, 2002.

BACKGROUND OF THE INVENTION

1. Field of the Invention

This invention relates to liquid ink compositions comprising a charge director, a grafted co-polymer having at least one acidic group or at least one basic group, and a dispersant having at least one basic group or at least one acid group, respectively. In particular, this invention relates to a liquid ink which exhibits improved dispersion stability and improved chargeability when used in any imaging process, including but not limited to ink transfer processes, ionographic processes, electrographic processes and electrophotographic color printing processes or proofing processes.

2. Background of the Art

Liquid inks are widely used in a variety of imaging and printing processes, for example offset, bubble jet, ink jet, intaglio, rotogravure, electrographic, and electrophotographic printing. Many characteristics desired in pigment dispersions for liquid inks are the same for each of the respective processes even though the final ink formulations may be substantially different. For example, the stability of the pigment dispersion on the shelf, under shear conditions, and under high voltage fields is an important consideration regardless of the final use of the liquid ink. The art continuously searches for more stable pigment dispersions to provide more flexibility in ink formulations to provide better efficiency and waste reduction in the various printing processes.

In electrophotographic applications, which include devices such as photocopiers, laser printers, facsimile machines and the like, liquid inks are referred to as liquid toners or developers. Generally, the electrophotographic process includes the steps of forming a latent electrostatic image on a charged photoconductor by exposing the photoconductor to radiation in an imagewise pattern, developing a temporary image on the photoconductor by contacting the photoconductor with a liquid ink, and finally transferring the temporary image to a receptor. The final transfer step may be performed either directly from the photoconductor or indirectly through an intermediate transport member. The developed image is usually subjected to heat and/or pressure to permanently fuse the image to the receptor.

Liquid inks typically comprise an electrically insulating liquid that serves as a carrier for a dispersion of charged particles, known as toner particles. These toner particles are composed of at least a colorant (e.g. pigment or dye) and a polymeric binder. A charge control agent is often included as a component of the liquid developer to regulate the polarity and magnitude of the charge on the toner particles. Liquid inks can be categorized into two primary classes. For convenience, the two classes will be referred to as conventional liquid inks and organosol inks.

One problem in formulating liquid inks is the difficulty in obtaining liquid inks that have excellent dispersion stability. It is always desirable to obtain liquid ink compositions having excellent dispersion stability.

An important consideration in formulating liquid inks is the chargeability of the liquid ink. It is desirable for a liquid ink to have a high chargeability so that it can acquire enough quantity of charge to be forced under an electrical field to migrate and then to plate upon the imaged areas on the photoreceptor. The chargeability of a liquid ink is measured by its conductivity and its mobility. In general, liquid inks with high ink conductivity and high ink mobility are desirable.

This invention provides a liquid ink with a novel composition that exhibits increased dispersion stability and improved chargeability.

SUMMARY OF THE INVENTION

In a first aspect, the invention features a liquid ink that includes:

a) a carrier liquid having a Kauri-Butanol number less than 30;

b) a grafted co-polymer comprising a (co)polymeric steric stabilizer covalently bonded to a thermoplastic (co)polymeric core that is insoluble in the carrier liquid, wherein the grafted co-polymer is derived from at least a polymerizable organic compound having at least one acid group or at least one basic group;

c) a dispersant having at least an amine group when the graft copolymer has at least one acid group and the dispersant having at least one acid group when the graft copolymer has at least one basic group. The first system is referred to herein as an acid-base copolymer-dispersant system, and the second system is referred to as a base-acid copolymer dispersant system. The order in the names is indicative of the presence of the acid or basic group on the respective order of the materials (e.g., acid-base refers to the acid copolymer and the basic dispersant in the copolymer-dispersant system). In the basic-acidic system, the mole ratio of the amine group to the acid group is between 0.3 and 1.5; in the acidic-basic system, the mole ratio of the acid group to the amine group is between 0.3 and 1.5; and d) a positive charge director.

The liquid inks of the present invention will be described primarily with respect to electrophotographic office printing; however, it is to be understood that these liquid toners are not so limited in their utility and may also be employed in other imaging processes, other printing processes, or other ink transfer processes, such as high speed printing presses, photocopying apparatus, microfilm reproduction devices, facsimile printing, ink jet printer, instrument recording devices, and the like.

DETAILED DESCRIPTION OF THE INVENTION

A liquid ink includes:

a) a carrier liquid having a Kauri-Butanol number less than 30;

b) a grafted co-polymer comprising a (co)polymeric steric stabilizer covalently bonded to a thermoplastic (co)polymeric core that is insoluble in the carrier liquid, wherein the grafted co-polymer is derived from at least a polymerizable organic compound having at least one acid group or at least one basic group;

c) a dispersant having at least an amine group when the graft copolymer has at least one acid group and the dispersant having at least one acid group when the graft copolymer has at least one basic group; and d) a positive charge director.

This balancing of reactive capabilities on the grafted copolymer and dispersant can be referred to as an acidic-basic reactive copolymer dispersant system. There are two acidic-basic systems described above. The first system is referred to herein as an acid-base copolymer-dispersant system, and the second system is referred to as a base-acid copolymer dispersant system. The order in the names is indicative of the presence of the acid or base group on the respective order of the materials (e.g., acid-base refers to the acid copolymer and the basic dispersant in the copolymer-dispersant system). In the base-acid system, the mole ratio of the amine group to the acid group is between 0.3 and 1.5; in the acid-base system, the mole ratio of the acid group to the amine group is between 0.3 and 1.5; and A liquid ink composition is provided comprising a colorant, a charge control agent, and a binder dispersed in a liquid having a Kauri-Butanol (KB) number less than 30. "Kauri-Butanol" refers to an ASTM Test Method D1133-54T. The Kauri-Butanol Number (KB) is a measure of the tolerance of a standard solution of kauri resin in 1-butanol to an added hydrocarbon diluent and is measured as the volume in milliliters (mL) at 25° C. of the solvent required to produce a certain defined degree of turbidity when added to 20 g of a standard kauri-1-butanol solution. Standard values are toluene (KB=105) and 75% by volume of heptane with 25% by volume toluene (KB=40).

The carrier liquid may be selected from a wide variety of materials that are known in the art, but the carrier liquid preferably has a Kauri-Butanol number less than 30. The liquid is typically oleophilic, chemically stable under a variety of conditions, and electrically insulating. Electrically insulating refers to a liquid having a low dielectric constant and a high electrical resistivity. Preferably, the liquid has a dielectric constant of less than 5, more preferably less than 3. Electrical resistivities of carrier liquids are typically greater than $10^9$ Ohm-cm, more preferably greater than $10^{10}$ Ohm-cm. The carrier liquid preferably is also relatively nonviscous to allow movement of the charged particles during development, and sufficiently non-volatile to minimize evaporative losses in the stored developer. In addition, the carrier liquid should be chemically inert with respect to the materials or equipment used in the liquid electrophotographic process, particularly the photoreceptor and its release surface.

Non-limiting examples of suitable carrier liquids include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons, and the like), silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, N.J.), and most preferred carriers are the aliphatic hydrocarbon solvent blends such as Norpar™ 12, Norpar™ 13 and Norpar™ 15 (available from Exxon Corporation, N.J.).

The binder in this invention is an organosol. The organosol binder must have either acidic groups or basic groups to interact strongly with the colorant particles so that a stable dispersion can be obtained. Furthermore, dispersion stability and chargeability can be improved significantly by the addition of a dispersant with an opposite acidity or basicity to the binder. For example, if a positive charge director such as a metallic carboxylate is used, an organosol binder comprising acidic groups and a dispersion with basic groups can be used to improve dispersion stability and chargeability. On the other hand, if a negative charge director is used, an organosol binder comprising basic groups and a dispersion with acidic groups can be used to improve dispersion stability and chargeability.

An organosol is an amphipathic copolymer. The amphipathic copolymer comprises a soluble or marginally insoluble high molecular weight (co)polymeric steric stabilizer covalently bonded to an insoluble, thermoplastic (co) polymeric core.

Applicants are not to be limited by the theories of the operation of the practice of the invention, although the descriptions provided herein enable practice of the invention as claims. There may well be potential advantages of the present invention that can include improved stability of the liquid ink dispersion (owing to the presence of ionic bonds between the grafted copolymer and the dispersant as opposed to less strong van der Waals forces commonly present in such associations), and improved charge stability of the liquid ink (owing to the presence of ionic bonds between the grafted copolymer, the dispersant, and the charge director). The presence of amine and acid functional groups can improve the interaction of the grafted copolymer with the dispersant, charge director, and pigment thereby improving ink stability and temperature stability. The presence of amine and acid functional groups can improve interaction of the printed image with polymeric and cellulosic (e.g., paper) substrates, thereby improving the durability of the printed image, and thereby lowering the temperature required to fuse the image to the substrate.

Table 1 lists the Kauri-Butanol Number and Hildebrand solubility parameter for some common carrier liquids used in electrophotographic toners and Table 2 lists the Hildebrand solubility parameter and glass transition Temperature of common monomers.

TABLE 1

Solvent Values at 25° C.

| Solvent Name | Kauri-Butanol Number by ASTM Method D1133-54T (mL) | Hildebrand Solubility Parameter ($MPa^{1/2}$) |
|---|---|---|
| Norpar ™ 15 | 18 | 13.99 |
| Norpar ™ 13 | 22 | 14.24 |
| Norpar ™ 12 | 23 | 14.30 |
| Isopar ™ V | 25 | 14.42 |
| Exxsol ™ D80 | 28 | 14.60 |

Source: Calculated from equation #31 of *Polymer Handbook*, 3rd Ed., J. Brandrup E. H. Immergut, Eds. John Wiley, N.Y., p. VII/522 (1989).

TABLE 2

Monomer Values at 25° C.

| Monomer Name | Hildebrand Solubility Parameter ($MPa^{1/2}$) | Glass Transition Temperature (° C.)* |
|---|---|---|
| n-Octadecyl Methacrylate | 16.77 | −100 |
| n-Octadecyl Acrylate | 16.82 | −55 |
| Lauryl Methacrylate | 16.84 | −65 |
| Lauryl Acrylate | 16.95 | −30 |
| 2-Ethylhexyl Methacrylate | 16.97 | −10 |
| 2-Ethylhexyl Acrylate | 17.03 | −55 |
| n-Hexyl Methacrylate | 17.13 | −5 |
| n-Butyl Methacrylate | 17.22 | 20 |
| n-Hexyl Acrylate | 17.30 | −60 |
| n-Butyl Acrylate | 17.45 | −55 |

TABLE 2-continued

Monomer Values at 25° C.

| Monomer Name | Hildebrand Solubility Parameter (MPa$^{1/2}$) | Glass Transition Temperature (° C.)* |
|---|---|---|
| Ethyl Methacrylate | 17.90 | 66 |
| Ethyl Acrylate | 18.04 | −24 |
| Methyl Methacrylate | 18.17 | 105 |
| Vinyl Acetate | 19.40 | 30 |
| Methyl Acrylate | 20.2 | 5 |

Calculated using Small's Group Contribution Method, Small, P. A. *Journal of Applied Chemistry* 3 p. 71 (1953). Using Group Contributions from *Polymer Handbook*, 3rd Ed., J. Brandrup E. H. Immergut, Eds., John Wiley, N.Y., p. VII/525 (1989).

*Polymer Handbook*, 3rd Ed., J. Brandrup E. H. Immergut, Eds., John Wiley, N.Y., pp. VII/209–277 (1989).

The composition of the graft stabilizer is normally selected such that the Hildebrand Solubility Parameter of the graft stabilizer (shell) closely matches that of the carrier liquid to ensure that the stabilizer will be sufficiently solvated to dissolve in the carrier solvent. Virtually any polymerizable compound that exhibits a Hildebrand Solubility Parameter difference less than 3.0 MPa$^{1/2}$ relative to the carrier liquid may be used in forming a graft stabilizer. In addition, polymerizable compounds that exhibit a Hildebrand Solubility Parameter difference greater than 3.0 MPa$^{1/2}$ relative to the carrier liquid may be used in forming a copolymeric graft stabilizer, provided that the effective Hildebrand Solubility Parameter difference between the stabilizer and the carrier liquid is less than 3.0 MPa$^{1/2}$. The absolute difference in Hildebrand Solubility Parameter between the graft stabilizer (shell) and the carrier liquid is preferably less than 2.6 MPa$^{1/2}$.

In general, graft stabilizers derived from $C_6$–$C_{30}$ acrylates and methacrylates, such as lauryl methacrylate (LMA) and octadecyl acrylate (ODA), are very soluble in hydrocarbon carriers because their Hildebrand Solubility Parameters are close to those of hydrocarbon carriers. Non-limiting examples of suitable $C_6$–$C_{30}$ acrylic and methacrylic esters for use in the graft stabilizer composition include hexyl acrylate, 2-ethylhexyl acrylate, decyl acrylate, dodecyl (lauryl) acrylate, octadecyl (stearyl) acrylate, behenyl acrylate, hexyl methacrylate, 2-ethylhexyl(methacrylate), decyl acrylate, dodecyl (lauryl) methacrylate, octadecyl (stearyl) methacrylate, isobornyl acrylate, isobornyl methacrylate, and other acrylates and methacrylates which meet the solubility parameter requirements described above.

The graft stabilizer may be chemically bonded to the resin core (e.g., grafted to the core) or may be adsorbed onto the core such that it remains as a physically bound integral part of the resin core, including fusion to the core. Any number of reactions known to those skilled in the art may be used to effect grafting of the soluble polymeric stabilizer to the organosol core during free radical polymerization. Common grafting methods include random grafting of polyfunctional free radicals; ring-opening polymerizations of cyclic ethers, esters, amides or acetals; epoxidations; reactions of hydroxyl or amino chain transfer agents with terminally-unsaturated end groups; esterification reactions (e.g., glycidyl methacrylate undergoes tertiary-amine catalyzed esterification with methacrylic acid); and condensation reactions or polymerization. Preferred weight average molecular weights of the graft stabilizer are from 50,000 to 1,000,000 Daltons (Da), more preferably from 100,000 to 500,00 Da, most preferably from 100,000 to 300,000 Da.

The polydispersity of the graft stabilizer also has an affect on imaging and transfer performance of the liquid toners. Generally, it is desirable to maintain the polydispersity (the ratio of the weight-average molecular weight to the number average molecular weight) of the graft stabilizer below 15, more preferably below 5, most preferably below 2.5.

The stabilizer is grafted to the insoluble core. The grafting site is formed by incorporating hydroxyl groups into the graft stabilizer during a first free radical polymerization and catalytically reacting all or a portion of these hydroxyl groups with an ethylenically unsaturated aliphatic isocyanate (e.g., meta-isopropenyldimethylbenzyl isocyanate [TMI] or 2-cyanatoethylmethacrylate [IEM] to form a polyurethane linkage during a subsequent non-free radical reaction step. The graft stabilizer is then covalently bonded to the nascent insoluble acrylic (co)polymer core via reaction of the unsaturated vinyl group of the grafting site with ethylenically-unsaturated core monomers (e.g. vinyl esters, particularly acrylic and methacrylic esters with carbon numbers less than 7 or vinyl acetate; vinyl aromatics, such as styrene; acrylonitrile; n-vinyl pyrrolidone; vinyl chloride and vinylidene chloride) during a subsequent free radical polymerization step.

Other methods of effecting grafting of the preformed polymeric stabilizer to the incipient insoluble core particle are known to those skilled in the art. For example, alternative grafting protocols are described in sections 3.7–3.8 of Barrett *Dispersion Polymerization in Organic Media*, K. E. J. Barrett, ed., (John Wiley: New York, 1975), pp. 79–106. A particularly useful method for grafting the polymeric stabilizer to core utilizes an anchoring group. The function of the anchoring groups is to provide a covalent link between the core part of the particle and the soluble component of the steric stabilizer. Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutyvinylether, 9-octadecen-1-ol, cinnamyl alcohol, allyl mercaptan, methallylamine; and azlactones, such as 2-alkenyl-4,4-dialkylazlactone of the structure

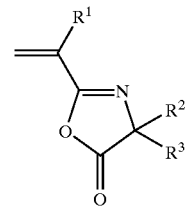

where $R^1$=H, or alkyl groups having 1 to 5 carbons, preferably one carbon, $R^2$ and $R^3$ are independently lower alkyl groups having 1 to 8 carbons, preferably 1 to 4 carbons.

Most preferably, however, the grafting mechanism is accomplished by grafting an ethylenically-unsaturated isocyanate (e.g., dimethyl-m-isopropenyl benzylisocyanate, available from American Cyanamid) to hydroxyl groups previously incorporated into the graft stabilizer precursor (e.g., by use of hydroxy ethyl methacrylate).

The core polymer may be made in situ by copolymerization with the stabilizer monomer. The composition of the insoluble resin core is preferentially manipulated such that the resin core exhibits a low glass transition temperature (Tg) that allows one to formulate an ink composition containing the resin as a major component to undergo rapid film formation (rapid self-fixing) in printing or imaging processes carried out at temperatures greater than the core Tg, preferably at or above 23° C. Rapid self-fixing assists in avoiding printing defects (such as smearing or trailing-edge tailing) and incomplete transfer in high speed printing.

Non-limiting examples of polymerizable organic compounds suitable for use in the organosol core include monomers such as, methyl acrylate, ethyl acrylate, butyl acrylate, methyl(methacrylate), ethyl(methacrylate), butyl (methacrylate), and other acrylates and methacrylates, most preferred being methylmethacrylate and ethylacrylate.

To form a stable ink dispersion, the organosol particles should have the ability to interact strongly with the colorant pigment particles. This requires that organosol particles contain moieties that can either chemical bond to or physical adsorb onto the pigment surface. Organosols containing amine groups or acid groups can promote the interaction between the organosol and the pigment and thus stabilize the ink dispersion. Such organosols can be prepared by incorporating polymerizable organic compounds containing acid or amine groups into either the thermoplastic (co)polymeric core or the (co)polymeric steric stabilizer by copolymerizing such polymerizable organic compounds with other conventional monomers for either the thermoplastic (co)polymeric core or the (co)polymeric steric stabilizer accordingly.

Non-limiting examples of polymerizable organic compounds having at least an acid group are 4-vinylbenzoic acid, fumaric acid, cinnamic acid, sorbic acid, mesaconic acid, maleic acid, glutaconic acid, citraconic acid, itaconic acid, indene-3-carboxylic acid, and alpha-beta unsaturated alkenoic acids such as acrylic acid, methacrylic acid, crotonic acid, 2-methacryloyloxyethyl hydrogen phthalate, 4-methacrylamidobenzoic acid, mono-(2-methacryloyloxyethyl)-succinic acid, and 2-methyl-2-pentenoic acid. The preferred polymerizable organic compounds having at least an acid group are acrylic acid and methacrylic acid.

Non-limiting examples of polymerizable organic compounds having at least an amine group are selected from the group consisting of (meth)acrylates having aliphatic amino radicals such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-benzyl, N-ethylaminoethyl(meth)acrylate, N,N-dibenzylaminoethyl (meth)acrylate, N-octyl, N,N-dihexylaminoethyl(meth) acrylate and the like; nitrogen-containing heterocyclic vinyl monomers such as N-vinylimidazole, N-vinylimidazole, N-vinyltetrazole, 2-vinylpyridine, 4-vinylpyridine, 2-methyl-5-vinylpyridine, 2-vinylquinoline, 4-vinylquinoline, 2-vinylpyrazine, 2-vinyloxazole, 2-vinylbenzooxazole and the like; N-vinyl substituted ring-like amide monomers such as N-vinylpyrrolidone, N-vinylpiperidone, N-vinyloxazolidone and the like; (meth) acrylamides such as N-methylacrylamide, N-octylacrylamide, N-phenylmethacrylamide, N-cyclohexylacrylamide, N-phenylethylacrylamide, N-p-methoxy-phenylacrylamide, acrylamide, N,N-dimethylacrylamide, N,N-dibutylacrylamide, N-methyl, N-phenylacrylamide, piperidine acrylate, morpholine acrylate and the like; aromatic substituted ethylene monomers containing amino radicals such as dimethlaminostyrene, diethylaminostyrene, diethylaminomethylstyrene, dioctylaminostyrene and the like; and nitrogen-containing vinylether monomers such as vinyl-N-ethyl-N-phenylaminoethylether, vinyl-N-butyl-N-phenylaminoethylether, triethanolamine divinylether, vinyldiphenylaminoethylether, vinypyrrolizylaminoether, vinyl-beta-morpholinoethylether, N-vinylhydroxyethylbenzamide, m-aminophenylvinylether and the like. The preferred polymerizable organic compounds having at least an amine group are N,N-dimethylaminoethyl(meth)acrylate and N,N-diethylaminoethyl(meth)acrylate.

Other polymers which may be used either alone or in conjunction with the aforementioned materials, include melamine and melamine formaldehyde resins, phenol formaldehyde resins, epoxy resins, polyester resins, styrene and styrene/acrylic copolymers, vinyl acetate and vinyl acetate/acrylic copolymers, acrylic and methacrylic esters, cellulose acetate and cellulose acetate-butyrate copolymers, and poly (vinyl butyral) copolymers.

The optimal weight ratio of the resin core to the stabilizer shell is on the order of 1/1 to 15/1, preferably between 2/1 and 10/1, and most preferably between 4/1 and 8/1. Undesirable effects may accompany core/shell ratios selected outside of these ranges. For example, at high core/shell ratios (above 15), there may be insufficient graft stabilizer present to sterically-stabilize the organosol with respect to aggregation. At low core/shell ratios (below 1), the polymerization may have insufficient driving force to form a distinct particulate phase resulting in a copolymer solution, not a self-stable organosol dispersion.

The particle size of the organosols also influences the imaging, drying and transfer characteristics of the liquid inks. Preferably, the primary particle size (determined with dynamic light scattering) of the organosol is between about 0.05 and 5.0 microns, more preferably between 0.15 and 1 micron, most preferably between 0.20 and 0.50 microns.

Any number of methods may be used for effecting particle size reduction of the pigment in preparation of the gel liquid toners. Some suitable methods include high shear homogenization, ball-milling, attritor milling, high energy bead (sand) milling or other means known in the art.

A liquid ink utilizing the aforementioned organosol comprises colorant particles embedded in the thermoplastic organosol resin. Useful colorants are well known in the art and include materials such as dyes, stains, and pigments. Preferred colorants are pigments that may be incorporated into the polymer resin, are nominally insoluble in and nonreactive with the carrier liquid, and are useful and effective in making visible the latent electrostatic image. Non-limiting examples of typically suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105, 138 and 111), azo red (C.I. Pigment Red 3, 17, 22, 23, 38, 48:1, 48:2, 52:1, 81, 81:4 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

The optimal weight ratio of resin to colorant in the toner particles is on the order of 1/1 to 20/1, preferably between 3/1 and 10/1 and most preferably between 5/1 and 8/1. The total dispersed material in the carrier liquid typically represents 0.5 to 70 weight percent, preferably between 1 and 25 weight percent, most preferably between 2 and 12 weight percent of the total liquid developer composition.

An electrophotographic liquid toner may be formulated by incorporating a dispersant into the liquid ink. The dispersant may be a polymer which has a high affinity to both the toner particles and to the carrier liquid. It either completely or partially dissolves in the carrier liquid or swells with the carrier liquid.

These polymers are not specifically limited to, but may include polyolefins, polyvinyl alcohol, polyvinyl methylether, polyvinyl ethylether, polyethylene oxide, gelatine, methyl cellulose, methylhydroxypropyl cellulose, ethyl cellulose, sodium salts of carboxymethyl cellulose, starch, polymers having at least an acid group, and polymers having at least an amine group. The preferred dispersants are polymers having at least an acid group and polymers having at least an amine group.

Non-limiting examples of dispersants having at least an acid group are polyacrylic acid and hydrocarbon soluble copolymers thereof; polymethacrylic acid and hydrocarbon soluble copolymers thereof; polystyrenesulfonic acid and hydrocarbon soluble copolymers thereof; polyvinylsulfonic acid and hydrocarbon soluble copolymers thereof; styrene/maleic acid copolymers and hydrocarbon soluble derivatives thereof; and vinyl methyl ether/maleic acid copolymers and hydrocarbon soluble derivatives thereof. All dispersant preferably have, but do not necessarily require, weight average molecular weights of 1,000 to 100,000. The preferred acidic polymeric dispersants are hydrocarbon soluble copolymers comprising acrylic acid, methacrylic acid, or their combinations, such as Solsperse™ 28000 (commercially available from Avecia Pigments and Additives Group, Charlotte, N.C.).

Non-limiting examples of dispersants having at least an amine group are polyvinyl pyrrolidone, polyamine, polyethyleneimine, poly(meth)acrylates containing amine groups, copolymers of alkyl (meth)acrylate and (meth) acrylates containing amine groups, and their hydrocarbon soluble derivatives. The preferred dispersants having at least an amine group for this invention are hydrocarbon soluble copolymers derived from tertiary amine monomers such as dimethylaminoethyl methacrylate such as Solsperse 13940 (commercially obtained from Avecia Pigments and Additives Group, Charlotte, N.C.) and Disperbyk™ 116 (commercially obtained from Byk Chemie—USA, Inc., Wallingford, Conn.).

The dispersant is preferably added to the carrier liquid at the rate from 0.01% to 20% by weight for improving the dispersibility and preventing rise in viscosity of the carrier liquid due to addition of the dispersant. More preferably, the rate is substantially in a range from 0.1% to 10% by weight.

A rate of the total weight of the solid components such as the toner, charge director and dispersant with respect to the total weight of the liquid developer is preferably in a range from about 1% to 90% by weight. For the purpose of reducing the total amount of the liquid developer used for the developing, and thereby facilitating the handling, the total rate of the solid components is more preferably in a range from 2% to 50% by weight.

An electrophotographic liquid toner may be formulated by incorporating a charge control agent into the liquid ink. The charge control agent, also known as a charge director, provides improved uniform charge polarity of the toner particles. The charge director may be incorporated into the toner particles using a variety of methods, such as chemically reacting the charge director with the toner particle, chemically or physically adsorbing the charge director onto the toner particle (resin or pigment), or chelating the charge director to a functional group incorporated into the toner particle. A preferred method is attachment via a functional group built into the graft stabilizer. The charge director acts to impart an electrical charge of selected polarity onto the toner particles. Any number of charge directors described in the art may be used.

For example, the charge director may be organic acid metal salts consisting of polyvalent metal ions and organic anions as the counterion. Non-limiting examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Non-limiting examples of suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, abietic acid, naphthenic acid, octanoic acid, lauric acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids containing at least 6–7 carbons and cyclic aliphatic acids including naphthenic acid; more preferred are polyvalent metal soaps of zirconium and aluminum; most preferred is the zirconium soap of octanoic acid (Zirconium HEX-CEM from Mooney Chemicals, Cleveland, Ohio).

The convention charge director for negative charged inks may also be used. Non-limiting examples of suitable negative charge directors are polymers or copolymers having nitrogen-containing monomer, quaternary ammonium block copolymers, lecithin, basic metallic petronates such as basic barium petronate, basic calcium petronate, and basic sodium petronate, metal naphthenate compounds, and polyisobutylene succinimide available as OLOA 1200 from Chevron Oronite Company LLC, Houston, Tex., and the like. Specific examples for the nitrogen-containing monomer are (meth) acrylates having an aliphatic amino group, vinyl monomers having nitrogen-containing heterocyclic ring, cyclic amide monomers having N-vinyl substituent, (meth)acrylamides, aromatic substituted ethlylenic monomers having nitrogen-containing group, nitrogen-containing vinyl ether monomers, etc. Particularly preferable is a copolymer which is soluble in a hydrocarbon carrier liquid and containing a monomer such as hexyl (meth)acrylate, cyclohexyl (meth) acrylate, 2-ethylhexyl (meth)acrylate, octyl (meth)acrylate, nonyl (meth)acrylate, decyl (meth)acrylate, dodecyl (meth) acrylate, lauryl (meth)acrylate, stearyl (meth)acrylate, vinyl laurate, vinyl stearate, benzyl (meth)acrylate and pheny (meth)acrylate. Preferred negative charge directors are lecithin, basic metallic petronate, and polyisobutylene succinimide.

The preferred charge direction levels for a given toner formulation will depend upon a number of factors, including the composition of the graft stabilizer and organosol, the molecular weight of the organosol, the particle size of the organosol, the core/shell ratio of the graft stabilizer, the pigment used in making the toner, and the ratio of organosol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

A liquid toner comprising a carrier liquid, a binder, a dispersant, a charge director, and a colorant can be formulated in various ways. This invention discovers that a positive liquid toner comprising an organosol having acid groups, preferably with an acid value greater than 10 mg KOH/g, a dispersant having amine groups such that the mole ratio of the amine groups to the acid groups is between 0.3 and 1.5, and an organic acid metal salt charge director possesses unexpected dispersion stability and chargeability. Furthermore, a negative liquid toner comprising an organosol having amine groups, a dispersant having acid groups such that the mole ratio of the acid groups to the amine groups is between 0.3 and 1.5, and a nitrogen-containing charge director has unexpected dispersion stability and chargeability.

The acid value can be measured by a method according to JIS (Japanese Industrial Standard) K0070. Specifically, the dispersant polymer is dissolved in a 1:1 or 2:1 mixed solution of diethyl ether with either 99.5% ethanol or isopropyl alcohol, and then phenolphthalein is added thereinto as an indicator. Titration is then carried out using a 0.1 mol/liter solution of potassium hydroxide in ethanol. The amount of the dispersant polymer, which is a sample, is 20 g, 10 g, 5 g, 2 g and 1 g in the case wherein the acid value is less than 5, not less than 5 and less than 15, not less than 15 and less than 30, not less than 30 and less than 100, and 100 or more, respectively. The acid value is calculated by using the value from the titration and the following equation:

$$\text{Acid value} = B \times F \times 5.611/S,$$

wherein B represents the amount (ml) of the 0.1 mol/liter solution of potassium hydroxide in ethanol which is required for the titration, F represents a factor of the 0.1 mol/liter solution of potassium hydroxide in ethanol, and S represents the weight (g) of a sample.

The amine value can be measured by a method according to JIS K 7237. Specifically, 8.5 ml of perchloric acid is added into a solution wherein 500 ml of acetic acid is beforehand mixed with 30 ml of acetic anhydride, and then mixed. Further, acetic acid is added into this mixture so that the total amount is 1000 ml. This mixture is permitted to stand a whole day and night to obtain a titrating solution. 100 ml of a solution of a mixture of 900 ml of o-nitrotoluene and 200 ml of acetic acid is added into a sample corresponding to 2-3 mmols of basic nitrogen, and then dissolved therein. Several drops of a 0.1 g/100 ml solution of Crystal Violet in acetic acid are then added into this mixture. Subsequently, titration is carried out by using the aforementioned perchloric acid until the blue color starts to turn greenish. The amine value is calculated by using the value from this titration and the following equation:

$$\text{Amine value} = 56.11 \times 0.1 \times (V_3 - V_4) \times F/M_2,$$

wherein $V_3$ represents the amount (ml) of the 0.1 mol/liter perchloric acid solution which is required for the titration, $V_4$ represents the amount (ml) of the 0.1 mol/liter perchloric acid solution which is required for a blank test, F represents the factor of the 0.1 mol/liter perchloric acid solution, and $M_2$ represents the weight (g) of a sample.

The conductivity of a liquid toner has been well established in the art as a measure of the effectiveness of a toner in developing electrophotographic images. The useful conductivity range is from about $1 \times 10^{-11}$ mho/cm to $10 \times 10^{-10}$ mho/cm. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice. There has, in recent times, been a realization that even with the use of charge directors there can be much unwanted charge situated on charged species in solution in the carrier liquid. Such unwanted charge produces inefficiency, instability and inconsistency in the development.

Suitable efforts to localize the charges onto the toner particles and to ensure that there is substantially no migration of charge from those particles into the liquid, and that no other unwanted charge moieties are present in the liquid, give substantial improvements. As a measure of the required properties, we use the ratio between the conductivity of the carrier liquid as it appears in the liquid toner and the conductivity of the liquid toner as a whole (the completely constituted toner dispersion). This ratio should be less than 0.6 preferably less than 0.4 and most preferably less than 0.3. Many prior art toners examined have shown ratios much larger than this, in the region of a ratio of 0.95.

In electrophotography, the electrostatic image is typically formed on a sheet, drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it may be desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged, non-image areas. Excess liquid toner remaining on the photoreceptive element is removed by techniques well known in the art. Thereafter, the photoreceptive element surface may be force dried or allowed to dry at ambient conditions.

The substrate for receiving the image from the photoreceptive element can be any commonly used receptor material, such as paper, coated paper, polymeric films and primed or coated polymeric films. Specially coated or treated metal or metallized surfaces may also be used as receptors. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ film materials are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

In multicolor imaging, the toners may be applied to the surface of the dielectric element or photoreceptive element in any order, but for colorimetric reasons, bearing in mind the inversion that occurs on transfer, it is sometimes preferred to apply the images in a specified order depending upon the transparency and intensity of the colors. A preferred order for a direct imaging or a double transfer process is yellow, magenta, cyan and black; for a single transfer process, the preferred order is black, cyan, magenta and yellow. Yellow is generally imaged first on the photoconductor to avoid contamination from other toners and to be the topmost color layer when transferred. Black is generally imaged last on the photoconductor due to the black toner acting as a filter of the radiation source and to be the bottom-most layer after transfer.

In order to function most effectively, liquid toners should have conductance values in the range of 10 to 400 picomho-$cm^{-1}$. Liquid toners prepared according to the present invention have conductance values of from 20 to 300 picomho-$cm^{-1}$ for a dispersion containing 2.5% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used with this invention.

These and other aspects of the present invention are demonstrated in the illustrative examples that follow. These examples are to be viewed as illustrative of specific materials falling within the broader disclosure presented above and are not to be viewed as limiting the broader disclosure.

EXAMPLES

Glossary of Chemical Abbreviations & Chemical Sources

The following raw materials were used to prepare the polymers in the examples which follow:

The catalysts used in the examples are Azobisisobutyronitrile (designated as AIBN, commercially obtained as VAZO™-64 from DuPont Chemicals, Wilmington, Del.); Dibutyl Tin Dilaurate (designated as DBTDL, commercially obtained from Aldrich Chemical Co., Milwaukee, Wis.); and 2,2'-Azobisisobutyronitrile (designated as AZDN, commercially obtained from Elf Atochem, Philadelphia, Pa.). The monomers are all available from Scientific Polymer Products, Inc., Ontario, N.Y. unless designated otherwise.

The monomers used in the examples are designated by the following abbreviations: Dimethyl-m-isopropenyl benzyl-isocyanate (TMI, commercially obtained from CYTEC Industries, West Paterson, N.J.); Ethyl Acrylate (EA); Ethyl methacrylate (EMA); 2-Hydroxyethyl Methacrylate (HEMA); lauryl methacrylate (LMA); methyl methacrylate (MMA); and N,N-dimethylaminoethyl methacrylate (DMAEMA).

TEST METHODS

The following test methods were used to characterize the polymers and inks in the examples that follow:

Percent Solids of Liquid Ink

Percent solids of the graft stabilizer solutions, and the organosol and ink dispersions, were determined gravimetrically using a halogen lamp drying oven attachment to a precision analytical balance (commercially obtained from Mettler Instruments Inc., Hightstown, N.J.). Approximately two grams of sample were used in each determination of percent solids using this sample dry down method.

Graft Stabilizer Molecular Weight

Various properties of the graft stabilizer have been determined to be important to the performance of the stabilizer, including molecular weight and molecular weight polydispersity. Graft stabilizer molecular weight is normally expressed in terms of the weight average molecular weight ($M_w$), while molecular weight polydispersity is given by the ratio of the weight average molecular weight to the number average molecular weight ($M_w/M_n$). Molecular weight parameters were determined for graft stabilizers with gel permeation chromatography (GPC) using tetrahydrofuran as the carrier solvent. Absolute $M_w$ was determined using a Dawn DSP-F light scattering detector (commercially obtained from Wyatt Technology Corp, Santa Barbara, Calif.), while polydispersity was evaluated by ratioing the measured $M_w$ to a value of $M_n$ determined with an Optilab 903 differential refractometer detector (commercially obtained from Wyatt Technology Corp, Santa Barbara, Calif.).

Particle Size

Toner particle size distributions were determined using a Horiba LA-900 laser diffraction particle size analyzer (commercially obtained from Horiba Instruments, Inc, Irvine, Calif.). Toner samples were diluted approximately 1/500 by volume and sonicated for one minute at 150 watts and 20 kHz prior to measurement. Toner particle size was expressed on a number-average basis in order to provide an indication of the fundamental (primary) particle size of the ink particles.

Toner Conductivity

The liquid toner conductivity (bulk conductivity, $k_b$) was determined at approximately 18 Hz using a Scientifica model 627 conductivity meter (commercially obtained from Scientifica Instruments, Inc., Princeton, N.J.). In addition, the free (dispersant) phase conductivity ($k_f$) in the absence of toner particles was also determined. Toner particles were removed from the liquid milieu by centrifugation at 5° C. for 1–2 hours at 6,000 rpm (6,110 relative centrifugal force) in a Jouan MR1822 centrifuge (commercially obtained from Jouan Inc., Winchester, Va.). The supernatant liquid was then carefully decanted, and the conductivity of this liquid was measured using a Scientifica Model 627 conductance meter. The percentage of free phase conductivity relative to the bulk toner conductivity was then determined as: 100% ($k_f/k_b$).

Particle Mobility

Toner particle electrophoretic mobility (dynamic mobility) was measured using a Matec MBS-8000 Electrokinetic Sonic Amplitude Analyzer (commercially obtained from Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, dispersant liquid viscosity, and liquid dielectric constant.

Preparation of Graft Stabilizer

A 5 litre 3-necked round bottom flask equipped with a condenser, a thermocouple connected to a digital temperature controller, a nitrogen inlet tube connected to a source of dry nitrogen and an overhead stirrer was charged with a mixture of 2561 g of Norpar™ 12 (commercially available from Exxon Mobil Chemical, Houston Tex.), 849 g of LMA (commercially available from Aldrich Chemical, Milwaukee, Wis.), 26.8 g of 98% HEMA (commercially available from Rohm and Haas, Philadelphia Pa.), and 8.31 g of AIBN (commercially available from Aldrich Chemical, Milwaukee, Wis.). While the mixture was stirred, the reaction flask was purged with dry nitrogen for 30 minutes at a flow rate of approximately 2 liters/minute. A hollow glass stopper was then inserted into the open end of the condenser and the nitrogen flow rate was reduced to approximately 0.5 liters/min. The mixture was heated to 70° C. with stirring, and the mixture was allowed to polymerize at 70° C. for 16 hours.

The mixture was heated to 90° C. and held at that temperature for 1 hour to destroy any residual AIBN, then was cooled back to 70° C. The nitrogen inlet tube was then removed, and 13.6 g of 95% DBTDL were added to the mixture, followed by 41.1 g of TMI. TMI was added dropwise over the course of approximately five minutes while the reaction mixture was stirred. The nitrogen inlet tube was replaced, the hollow glass stopper in the condenser was removed, and the reaction flask was purged with dry nitrogen for 30 minutes at a flow rate of approximately 2 liters/minute. The hollow glass stopper was reinserted into the open end of the condenser and the nitrogen flow rate was reduced to approximately 0.5 liter/min. The mixture was allowed to react at 70° C. for 6 hours, at which time the conversion was quantitative.

The mixture was then cooled to room temperature. The cooled mixture was a viscous, transparent liquid containing no visible insoluble matter. The percent of solids of the liquid mixture was determined to be 25.9%. Subsequent determination of molecular weight was made using the GPC method described above; the copolymer had a Mw of 266,050 Da and a Mw/Mn of 6.03 based upon two independent measurements. The product is a copolymer of LMA and HEMA containing random side chains of TMI.

Preparation of Organosol (Acid Functional)

A 5 litre 3-necked round bottom flask equipped with a condenser, a thermocouple connected to a digital temperature controller, a nitrogen inlet tube connected to a source of dry nitrogen and an overhead stirrer, was charged with a mixture of 2940 g of Norpar™ 12, 362.1 g of ethyl methacrylate (commercially available from Aldrich Chemical, Milwaukee, Wis.), 11.2 g of methacrylic acid (commercially available from Aldrich Chemical, Milwaukee, Wis.), 180.2 g of the graft stabilizer mixture prepared above (25.9%) and 6.3 g of AIBN. While the mixture was stirred, the reaction flask was purged with dry nitrogen for 30 minutes at a flow rate of approximately 2 liters/minute. A hollow glass stopper was then inserted into the open end of the condenser and the nitrogen flow rate was reduced to approximately 0.5 liter/min. The mixture was heated to 70° C. with stirring, and the mixture was allowed to polymerize at 70° C. for 16 hours. The conversion was quantitative.

Approximately 350 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white gel.

The percent of solids of this non-gel organosol dispersion was determined to be 22.4%. Subsequent determination of average particle size was made using the Horiba 900 laser light scattering particle size analyzer, which gave a volume average particle size of 114 microns.

Preparation of Organosol (Amine Functional)

A 5 L 3-necked round bottom flask equipped with a condenser, a thermocouple connected to a digital temperature controller, a nitrogen inlet tube connected to a source of dry nitrogen and an overhead stirrer, was charged with a mixture of 2940 g of Norpar™ 12, 366.7 g of ethyl methacrylate, 7.0 g of dimethylaminoethyl methacrylate (commercially available from Aldrich Chemical, Milwaukee, Wis.), 180.7 g of the graft stabilizer mixture (25.9%) prepared above, and 6.3 g of AIBN. While the mixture was stirred, the reaction flask was purged with dry nitrogen for 30 minutes at a flow rate of approximately 2 liters/minute. A hollow glass stopper was then inserted into the open end of the condenser and the nitrogen flow rate was reduced to approximately 0.5 liter/min. The mixture was heated to 70° C. with stirring, and the mixture was allowed to polymerize at 70° C. for 16 hours. The conversion was quantitative.

Approximately 350 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white gel.

The percent solids of this non-gel organosol dispersion was determined to be 15.6%. Subsequent determination of average particle size was made using the Horiba 900 laser light scattering particle size analyzer, which gave a volume average particle size of 13.2 microns.

Example 1

A 0.5 liter vertical bead mill (Model 6TSG-1/4, commercial available from Aimex Co., Ltd., Tokyo, Japan) was charged at room temperature with 390 g of 1.3 mm diameter Potters glass beads (commercial available from Potters Industries, Inc., Parsippany, N.J.), 137.9 g of the organosol (acid functional, 22.4%) prepared above, 4.32 g of 5.91 weight percent Zr Hexcem solution (commercial available from OMG Americas, Inc., Westlake, Ohio), 145.1 g of Norpar™ 12, 5.14 g of Cabot Monarch 120 black pigment (commercial available from Cabot Corporation, Billerica, N.Y.), and 7.66 g of 40% Solsperse™ 13940 hyperdispersant in petroleum distillate (commercial available from Avecia, Charlotte, N.C.). The sample was milled at 2000 rpm for 90 minutes without coolant circulating through the jacket to produce a black liquid electrophotographic toner concentrate.

The toner concentrate was analyzed and found to be 9.6 percent non-volatiles by weight and had conductivity of 997 pmho/cm. The volume average particle size of the toner was 7.2 microns. When diluted to 3% non-volatile, the toner sample had a conductivity of 262 pmho/cm and a particle mobility of 5.0E-11 $m^2$/V sec. The sample was centrifuged at 7500 rpm for 60 minutes at 5° C. and the conductivity of the supernatant liquid was measured and found to be 236 pmho/cm (the ratio of kf/kb was 0.90; i.e., 90% of the conductivity of the 3% (w/w) toner sample was attributed to the free phase).

This example shows that toner particles in an ink prepared using an organosol binder resin that contains carboxylic acid groups plus an amine functional dispersant are positively charged with a useful value of electrophoretic mobility.

Example 2

A 0.5 liter vertical bead mill (Model 6TSG-1/4, commercial available from Aimex Co., Ltd., Tokyo, Japan) was charged at room temperature with 390 g of 1.3 mm diameter Potters glass beads (commercially available from Potters Industries, Inc., Parsippany, N.J.), 211 g of the organosol (amine functional, 15.6%) prepared above, 20.7 g of a 4.69 weight percent soy lecithin solution in Norpar™ 12 (commercial available from Mother Natures Nutrition Stores, St. Paul, Minn.), 57.5 g of Norpar™ 12, 5.14 g of Cabot Mogul L black pigment (commercially available from Cabot Corporation, Billerica, N.Y.), and 5.25 g of Solsperse 28000 hyperdispersant (commercially available from Avecia, Charlotte, N.C.). The sample was milled at 2000 rpm for 90 minutes without coolant circulating through the jacket to produce a black liquid electrophotographic toner concentrate.

The toner concentrate was analyzed and found to be 14.8 percent non-volatiles by weight and had a conductivity of 552 pmho/cm. The volume average particle size of the toner was 4.2 microns. When diluted to 3% non-volatile, the toner sample had a conductivity of 108 pmho/cm and a particle mobility of −7.95E-11 $m^2/V$ sec. The sample was centrifuged at 7500 rpm for 60 minutes at 5° C. and the conductivity of the supernatant liquid was measured and found to be 62 pmho/cm (the ratio of kf/kb was 0.57; 57% of the conductivity of the 3% (w/w) toner sample was attributed to the free phase).

What this example shows is that toner particles in an ink prepared using an organosol binder resin that contains amine groups plus a carboxylic acid functional dispersant are negatively charged with a useful value of electrophoretic mobility.

A number of embodiments of the invention have been described. Nevertheless, it will be understood that various modifications may be made without departing from the spirit and scope of the invention. Accordingly, other embodiments are within the scope of the following claims.

What is claimed is:

1. A liquid ink comprising:
   a) a carrier liquid having a Kauri-Butanol number less than 30; characterized in that it further includes
   b) a grafted co-polymer comprising a copolymeric or polymeric steric stabilizer covalently bonded to a thermoplastic copolymeric or polymeric core that is insoluble in the carrier liquid, wherein the grafted co-polymer is derived from at least a polymerizable organic compound having at least one acid group or at least one basic group;
   c) a dispersant having, respectively, at least an amine group or at least one acid group to form an acid-base copolymer-dispersant system or a base-acid copolymer-dispersant system, wherein the mole ratio of the amine group to the acid group is between 0.3 and 1.5 in the base-acid copolymer-dispersant system and the mole ratio of the acid group to the base group in the acid-base copolymer dispersant system is between 0.3 and 1.5; and
   d) a positive charge director used with the acid-base copolymer-dispersant system or a negative charge director used with the base-acid copolymer-dispersant system.

2. A liquid ink according to claim 1, wherein the copolymer-dispersant system comprises an acid-base copolymer-dispersant system and the grafted co-polymer has an acid value greater than 10 mg KOH/g and there is a positive charge director present in the ink.

3. A liquid ink according to claim 1, wherein the copolymer-dispersant system comprises an acid-base copolymer-dispersant system and the grafted co-polymer has an acid value greater than 20 mg KOH/g and there is a positive charge director present in the ink.

4. A liquid ink according to claim 1, wherein the copolymer-dispersant system comprises an acid-base copolymer-dispersant system and the grafted co-polymer has an acid value greater than 30 mg KOH/g and there is a positive charge director present in the ink.

5. A liquid ink according to claim 1, wherein the copolymer-dispersant system comprises an acid-base copolymer-dispersant system and the thermoplastic copolymeric or polymeric core is derived from at least a polymerizable organic compound having at least one acid group and there is a positive charge director present in the ink.

6. A liquid ink according to claim 1, wherein the copolymer-dispersant system comprises an acid-base copolymer-dispersant system and the mole ratio of the amine group to the acid group is between 0.4 and 1.0 and there is a positive charge director present in the ink.

7. A liquid ink according to claim 1, wherein the copolymer-dispersant system comprises an acid-base copolymer-dispersant system and the dispersant comprises a hydrocarbon soluble copolymer derived from a tertiary amine monomer and there is a positive charge director present in the ink.

8. A liquid ink according to claim 1, wherein the copolymer-dispersant system comprises an acid-base copolymer-dispersant system and the charge director comprises at least an organic acid metal salt and there is a positive charge director present in the ink.

9. A liquid ink according to claim 1, wherein the copolymer-dispersant system comprises a base-acid copolymer dispersant system and the grafted co-polymer has an amine value in the range of 3 to 60 mg KOH/g and there is a negative charge director present in the ink.

10. A liquid ink according to claim 1, wherein the copolymer-dispersant system comprises a base-acid copolymer dispersant system and the grafted co-polymer has an amine value in the range of 5 to 50 mg KOH/g and there is a negative charge director present in the ink.

11. A liquid ink according to claim 1, wherein the copolymer-dispersant system comprises a base-acid copolymer-dispersant system and the grafted co-polymer has an amine value in the range of 10 to 40 mg KOH/g and there is a negative charge director present in the ink.

12. A liquid ink according to claim 1, wherein the copolymer-dispersant system comprises a base-acid copolymer-dispersant system and the thermoplastic copolymeric or polymeric core comprises at least an amine group and there is a negative charge director present in the ink.

13. A liquid ink according to claim 1, wherein the copolymer-dispersant system comprises a base-acid copolymer-dispersant system and the mole ratio of the acid group to the amine group is between 0.4 and 1.0 and there is a negative charge director present in the ink.

14. A liquid ink according to claim 1, wherein the copolymer-dispersant system comprises a base-acid copolymer-dispersant system and there is a negative charge director in the ink that is selected from the group containing lecithin, methacrylates or acrylates having an aliphatic amino group, vinyl monomers having nitrogen-containing heterocyclic ring, cyclic amide monomers having N-vinyl substituent, methacrylamides or acrylamides, aromatic substituted ethlylenic monomers having nitrogen-containing group, nitrogen-containing vinyl ether monomers.

15. A liquid ink according to claim 1, wherein the copolymer-dispersant system comprises a base-acid copolymer-dispersant system and there is a negative charge director present in the ink and the negative charge director comprises lecithin.

16. A liquid ink according to claim 1, wherein the copolymer-dispersant system comprises a base-acid copolymer-dispersant system and the dispersant comprises a hydrocarbon soluble copolymer derived from acrylic acid, methacrylic acid, or a combination thereof.

17. A liquid ink according to claim 1, wherein the copolymer-dispersant system comprises a base-acid copolymer-dispersant system, the ink further comprising at least a colorant and there is a negative charge director present in the ink.

* * * * *